US008264542B2

(12) United States Patent
Lee et al.

(10) Patent No.: US 8,264,542 B2
(45) Date of Patent: Sep. 11, 2012

(54) METHODS AND SYSTEMS FOR IMAGE PROCESSING IN A MULTIVIEW VIDEO SYSTEM

(75) Inventors: Kual-Zheng Lee, Chiayi County (TW); Fan-Di Jou, Taoyuan County (TW); Hung-Ming Chen, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 914 days.

(21) Appl. No.: 12/204,163

(22) Filed: Sep. 4, 2008

(65) Prior Publication Data
US 2009/0167866 A1 Jul. 2, 2009

Related U.S. Application Data

(60) Provisional application No. 61/018,365, filed on Dec. 31, 2007.

(51) Int. Cl.
 *H04N 7/18* (2006.01)
(52) U.S. Cl. ......... 348/159; 382/154; 386/223; 348/153
(58) Field of Classification Search ................. 348/153, 348/159, 169, 223; 382/154, 162, 167, 168, 382/254
See application file for complete search history.

(56) References Cited

U.S. PATENT DOCUMENTS

| | | | | |
|---|---|---|---|---|
| 7,375,728 B2 * | 5/2008 | Donath et al. | ................. | 345/427 |
| 7,609,855 B2 * | 10/2009 | Sada et al. | ..................... | 382/103 |
| 7,620,268 B2 * | 11/2009 | Myers et al. | .................. | 382/289 |
| 8,018,490 B2 * | 9/2011 | Yuasa et al. | .................... | 348/148 |
| 8,166,391 B2 * | 4/2012 | Kaneko | ......................... | 715/247 |
| 2004/0057599 A1 * | 3/2004 | Okada et al. | .................. | 382/103 |
| 2004/0095385 A1 | 5/2004 | Koo et al. | | |
| 2004/0119848 A1 * | 6/2004 | Buehler | ......................... | 348/239 |
| 2006/0087519 A1 * | 4/2006 | Berger et al. | ................. | 345/619 |
| 2006/0215031 A1 * | 9/2006 | Krahnstoever et al. | ....... | 348/187 |
| 2006/0227041 A1 * | 10/2006 | Okamoto | ....................... | 342/174 |
| 2007/0003141 A1 * | 1/2007 | Rittscher et al. | .............. | 382/181 |
| 2007/0165108 A1 * | 7/2007 | Yuasa et al. | .................... | 348/148 |
| 2008/0024610 A1 * | 1/2008 | Konishi | ......................... | 348/159 |
| 2008/0151049 A1 * | 6/2008 | McCubbrey et al. | ......... | 348/143 |
| 2009/0022396 A1 * | 1/2009 | Watanabe et al. | ............. | 382/167 |

OTHER PUBLICATIONS

Almansa, et al., "Vanishing Point Detection Without Any a Priori Information," *IEEE Transactions on Pattern Analysis and Machine Intelligence*, Apr. 2003, pp. 502-507, vol. 25, No. 4.

Nascimento, et al., "Performance Evaluation of Object Detection Algorithms for Video Surveillance," *IEEE Transactions on Multimedia*, Aug. 2006, pp. 761-774, vol. 8, No. 4.

(Continued)

*Primary Examiner* — Wing Chan
*Assistant Examiner* — Kostas Katsikis
(74) *Attorney, Agent, or Firm* — Alston & Bird LLP

(57) ABSTRACT

A system for image processing is provided. The system includes a region of interest (ROI) module receiving video from a camera and detects a ROI(s) in a first image. A lookup table generates a value responsive to block type for a first vanishing point (VP). A labeling module identifies a point "p" most close to the first VP, a point "q" most remote to the first VP and a length "h" between "p" and "q" in each ROI(s), and generates information on p, q and h. Another lookup table generates information on p', q' and h', wherein p' is a point most close to a second VP, q' is a point most remote to the second VP and h' is a length between p' and q' in ROI(s) in the second image. A transforming module transforms ROI(s) in the first image into an ROI in the second image.

20 Claims, 14 Drawing Sheets

OTHER PUBLICATIONS

Ozer, et al., "A Hierarchical Human Detection System in (Un)Compressed Domains," *IEEE Transactions on Multimedia*, Jun. 2002, pp. 283-300, vol. 4, No. 2.

Taiwan Intellectual Property Office, Office Action for Application No. 097145450, dated May 15, 2012, 4 pages, Taipei.

* cited by examiner

METHODS AND SYSTEMS FOR IMAGE PROCESSING IN A MULTIVIEW VIDEO SYSTEM

CROSS REFERENCE TO RELATED APPLICATION

This application claims the benefit of U.S. Provisional Application No. 61/018,365, filed Dec. 31, 2007.

BACKGROUND OF THE INVENTION

The present invention generally relates to image processing and, more particularly, to methods and systems for image processing in a multiview video system.

Image processing methods and devices have various applications, many of which may be applied to applications such as video surveillance, human motion analysis, traffic monitoring and other security-related purposes. Taking video surveillance as an example, closed-loop video monitoring systems have been used for security-related purposes over the past few decades. However, these systems may be limited to recording images in places of interest, and do not support analysis of objects or events. With the development and advancement in digital video and automatic intelligence techniques, intelligent monitoring systems based on computer vision have become popular in the security field. For example, intelligent surveillance systems may be deployed in airports, metro stations, banks, hotels, convenience stores and parking lots for identifying terrorists or crime suspects. A computer vision system may refer to one capable of automatically analyzing images taken by cameras without manual operation for identifying and tracking mobile objects such as people, vehicles, animals or articles.

Tracking moving objects may be a key problem in computer vision. Single-camera-multiple-object tracking may be simple in implementation but may be limited in scope of its applications. For example, it may be difficult for a single camera to provide adequate coverage of an environment because of limited field of view (FOV). To provide wider coverage of detection and robustness against occlusion, it may be necessary to have multiple cameras observing critical areas. Multiple-camera-multiple-object tracking may therefore be used in indoor and outdoor surveillance. Multiple cameras may also provide a more complete history of an object's actions in an environment. With the above-mentioned advantages compared to a single-view surveillance system, some multiview surveillance systems, however, may be complicated or costly. It may be desirable to have a method and a system that is able to detect objects and process images in a relatively simple and cost-effective manner in a multiview video system.

BRIEF SUMMARY OF THE INVENTION

Examples of the present invention may provide a system for image processing in a multiview video environment including a first camera and a second camera. The system comprises a region of interest (ROI) module configured to receive first video signals from the first camera and detect at least one ROI in a first image related to the first video signals, a first lookup table configured to generate an attribute value in response to a type of a block, wherein the type of a block is related to a first vanishing point defined in the first image, a labeling module configured to identify a first point "p" most close to the first vanishing point, a second point "q" most remote to the first vanishing point and a length "h" between the first point "p" and the second point "q" in each of the at least one ROI, and generate first information on p, q and h, a second lookup table configured to generate second information on p', q' and h' in response to the first information, wherein p' is a first point most close to a second vanishing point defined in a second image related to the second camera, q' is a second point most remote to the second vanishing point and h' is a length between the first point p' and the second point q' in each of at least one ROI in the second image, and a transforming module configured to transform each of the at least one ROI in the first image into an ROI in the second image based on the second lookup table.

Some examples of the present invention may provide a system for image processing in a multiview video environment. The system comprises a number of cameras $C_1$ to $C_N$, N being a positive integer, a region of interest (ROI) module configured to receive first video signals from the camera $C_1$ and detect at least one ROI in a first image related to the first video signals, a first lookup table configured to generate an attribute value in response to a type of a block, wherein the type of a block is related to a first vanishing point defined in the first image, a labeling module configured to identify a first point "p" most close to the first vanishing point and a second point "q" most remote to the first vanishing point and a length "h" between the first point "p" and the second point "q" in each of the at least one ROI, and generate first information on p, q and h, a second lookup table configured to generate second information on p', q' and h' in response to the first information, wherein p' is a first point most close to a second vanishing point defined in a second image related to each of the cameras $C_2$ to $C_N$, q' is a second point most remote to the second vanishing point and h' is a length between the first point p' and the second point q' in each of at least one ROI in the second image, and a number of transforming modules $T_2$ to $T_N$ configured to receive the first information and transform each of the at least one ROI in the first image into an ROI in the second image related to each of the cameras $C_2$ to $C_N$ based on the second lookup table.

Examples of the present invention may further provide a method for image processing in a multiview video environment including a first camera and a second camera. The method comprises receiving first video signals from the first camera, identifying at least one region of interest (ROI) in a first image related to the first video signals, configuring a first lookup table, wherein the first lookup table generates an attribute value in response to a type of a block, wherein the type of a block is related to a first vanishing point defined in the first image, identifying a first point "p" most close to the first vanishing point, a second point "q" most remote to the first vanishing point and a length "h" between the first point "p" and the second point "q" in each of the at least one ROI, and generating first information on p, q and h, configuring a second lookup table, wherein the second lookup table generates second information on p', q' and h' in response to the first information, wherein p' is a first point most close to a second vanishing point defined in a second image related to the second camera, q' is a second point most remote to the second vanishing point and h' is a length between the first point p' and the second point q' in each of at least one ROI in the second image, and transforming each of the at least one ROI in the first image into an ROI in the second image based on the second lookup table.

Examples of the present invention may still provide a method for image processing in a multiview video environment. The method comprises providing a number of cameras $C_1$ to $C_N$, N being a positive integer, receiving first video signals from the camera $C_1$, detect at least one region of interest (ROI) in a first image related to the first video signals, configuring a first lookup table, wherein the first lookup table generates an attribute value in response to a type of a block, wherein the type of a block is related to a first vanishing point defined in the first image, identifying a first point "p" most close to the first vanishing point and a second point "q" most remote to the first vanishing point and a length "h" between the first point "p" and the second point "q" in each of the at least one ROI, and generate first information on p, q and h, configuring a second lookup table, wherein the second lookup table generates second information on p', q' and h' in response to the first information, wherein p' is a first point most close to a second vanishing point defined in a second image related to each of the cameras $C_2$ to $C_N$, q' is a second point most remote to the second vanishing point and h' is a length between the first point p' and the second point q' in each of at least one ROI in the second image, and receiving the first information and transforming each of the at least one ROI in the first image into an ROI in the second image related to each of the cameras $C_2$ to $C_N$ based on the second lookup table.

BRIEF DESCRIPTION OF THE SEVERAL VIEWS OF THE DRAWINGS

The foregoing summary as well as the following detailed description of the preferred embodiments of the present invention will be better understood when read in conjunction with the appended drawings. For the purposes of illustrating the invention, there are shown in the drawings embodiments which are presently preferred. It is understood, however, that the invention is not limited to the precise arrangements and instrumentalities shown. In the drawings:

FIGS. 3C-1 and 3C-2 are diagrams illustrating the heights of an object on a ground plane projecting to image planes;

FIGS. 3D-1 and 3D-2 are diagrams illustrating inputs and outputs of a lookup table established in accordance with an example of the present invention;

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth in the appended claims.

Figure 1:
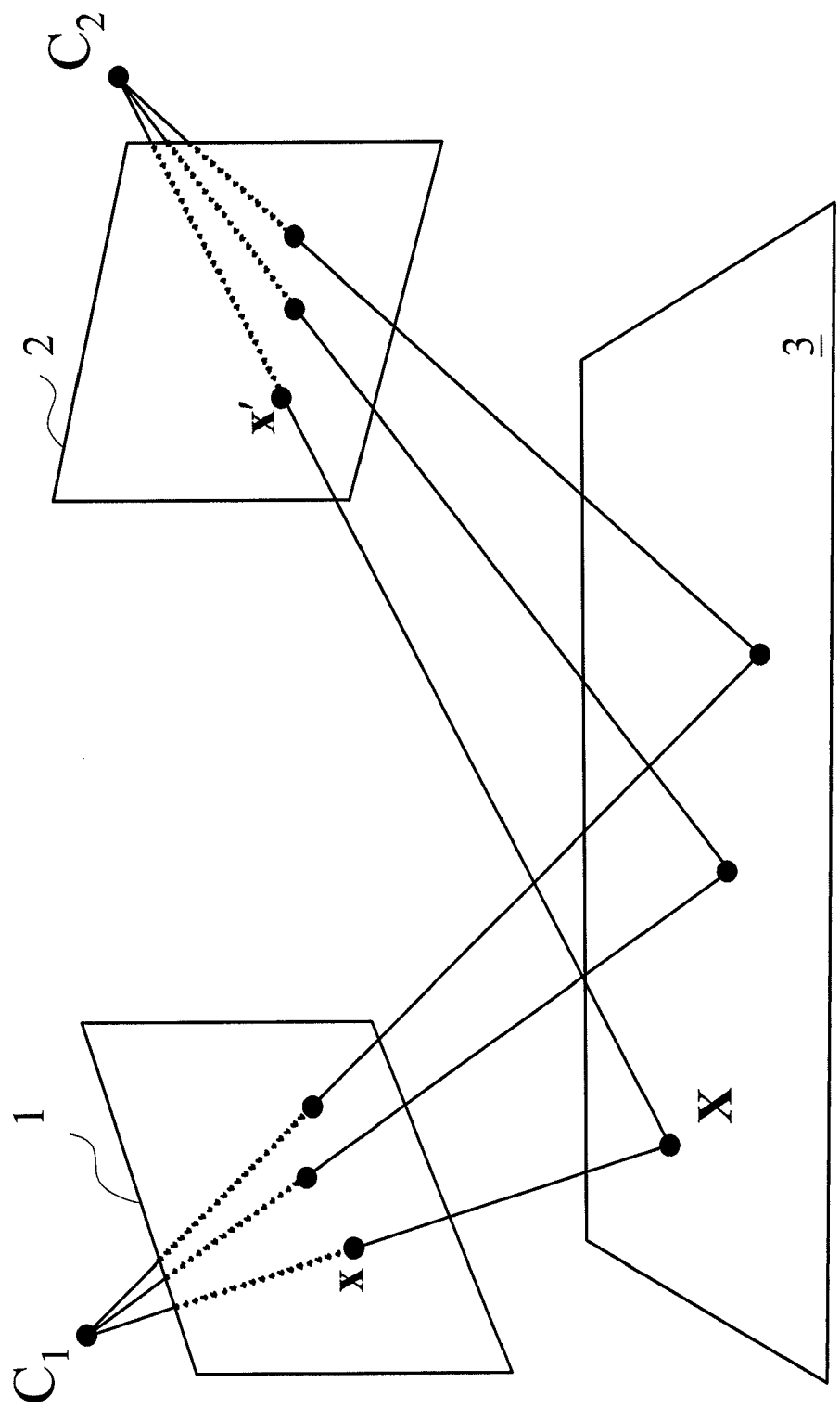
FIG. 1 is a schematic diagram illustrating the concept of homography between image planes.

FIG. 1 is a schematic diagram illustrating the concept of homography between image planes 1 and 2. Referring to FIG. 1, given a point "X" on a plane 3 in a space, the point X may be captured by a first camera $C_1$ and a second camera $C_2$ as a first projection point "x" on a first image plane 1 and a second projection point "x'" on a second image plane 2, respectively. For clarity, throughout the specification, an upper-case letter may denote a point in a three-dimensional (3D) space (hereinafter a 3D point) such as in the present case of the point "X", while a lower-case letter may denote a point in a two-dimensional (2D) plane (hereinafter a 2D point) such as in the present case of the point "x". Given the coordinates x(x, y) and x'(x', y'), a relation may exist between the projection points x and x' in Equation 1 as given below.

$$x' = H \cdot x, H = \begin{bmatrix} h_{11} & h_{12} & h_{13} \\ h_{21} & h_{22} & h_{23} \\ h_{31} & h_{32} & h_{33} \end{bmatrix} \quad \text{Equation 1}$$

Wherein H is a transfer matrix called "homography matrix" or "homograph" and, in the present case, a three-by-three (3×3) matrix. Furthermore, $h_{11}$ to $h_{33}$ are parameters for the homography matrix H. Homography may refer to a relation between two images, such that any given point in one image may correspond to one and only one point in the other image, and vice versa. The matrix H may be determined on the basis of four or more points (correspondence points) on the plane 3. If the projection points x and x' are known and, for example, four correspondence points, are selected, the matrix H may then be determined. In one example according to the present invention, the homography matrix or homograph "H" may be calculated using a "Singular Value Decomposition" (SVD) method or a "Least Median of Squares" (LMedS) method.

Given two fixed cameras $C_1$ and $C_2$ and a homography matrix H for the first camera $C_1$, a point with coordinates ($x_i$, $y_i$) in the first image 1 may correspond to a point with coordinates ($x_i'$, $y_i'$) in the second image 2 in accordance with Equation 2 as given below.

$$x_i' = \frac{h_{11}x_i + h_{12}y_i + h_{13}}{h_{31}x_i + h_{32}y_i + h_{33}}, y_i' \frac{h_{21}x_i + h_{22}y_i + h_{23}}{h_{31}x_i + h_{32}y_i + h_{33}}. \quad \text{Equation 2}$$

The above Equation 1 and Equation 2 may provide a desirable conversion between projection points in different image planes, given a point located on a reference plane such as the plane 3 illustrated in FIG. 1. However, in the absence of information on depth of field, an upright or standing object in the reference plane may appear recumbent in the image planes.

Figure 2A:
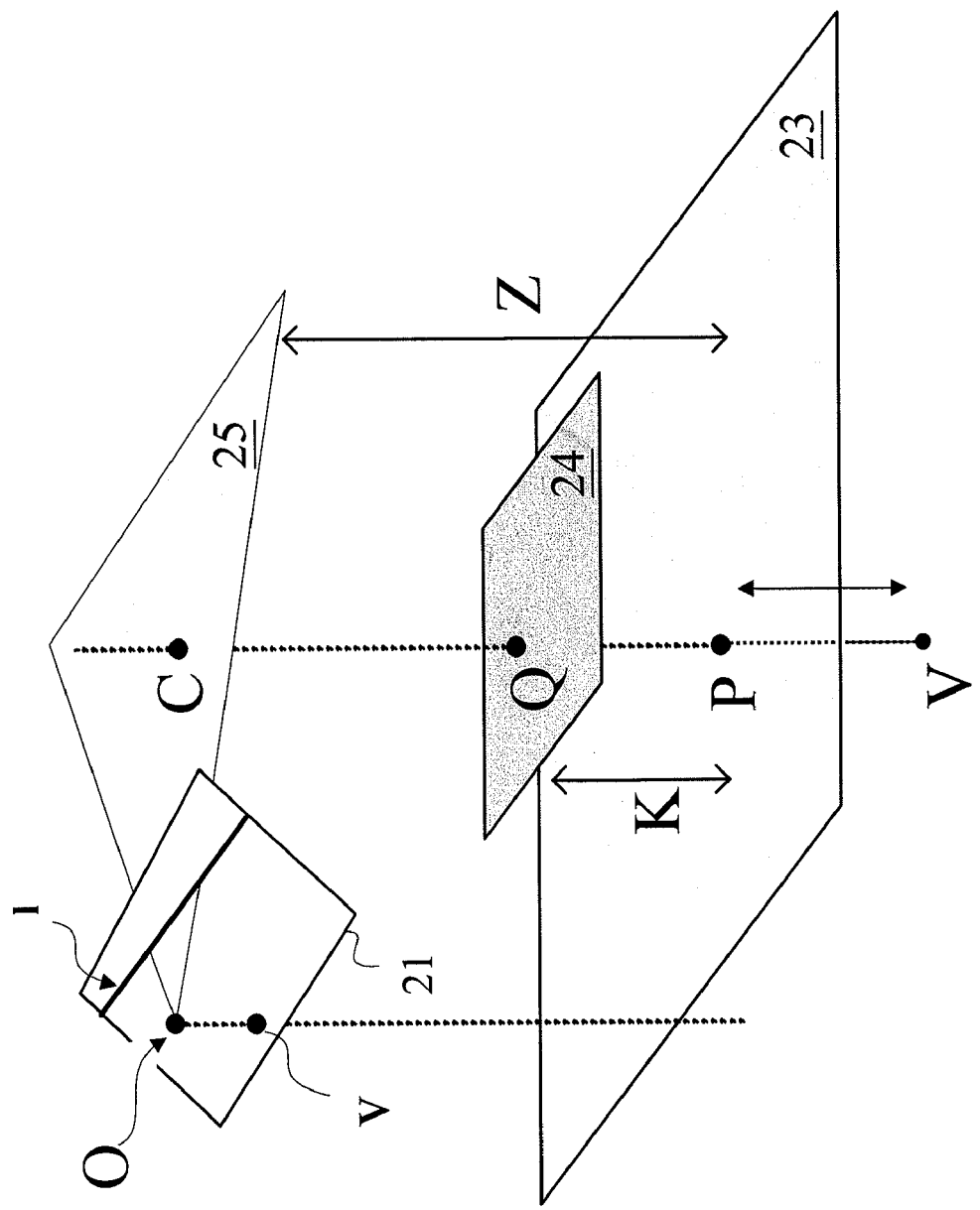
FIG. 2A is a schematic diagram illustrating the geometry related to a camera in a single-view video system.

FIG. 2A is a schematic diagram illustrating the geometry related to a camera in a single-view video system. Referring to FIG. 2A, an object of interest (ROI) having a height of "K" may appear within the field of view (FOV) of a first camera "O". The height "K" of the object may be defined by a bottom point P on a first plane 23 and a top point Q on a second plane 24 in parallel with the first pane 23. The first camera O may be positioned at a third plane 25 above the first plane 23 and separated therefrom by a distance of "Z". That is, Z, defined by the point P on the first plane 23 and a point C on the third plane 25, is the distance between the first plane 23 and the third plane 25 in parallel with the first plane 23 and also the level of the first camera O from the first plane 23. The points P, Q and C are colinear points. A vanishing line "l" may extend in an image plane 21 related to an FOV of the first camera O. Furthermore, a vanishing point "V" may exist at infinity and colinear with the points P, Q and C along the normal direction (shown in an arrowhead) of the first plane 23. The relationship between a vanishing line and vanishing points will be defined later. Note that the points P, Q, C and V, denoted in upper cases, are 3D points.

Figure 2B:
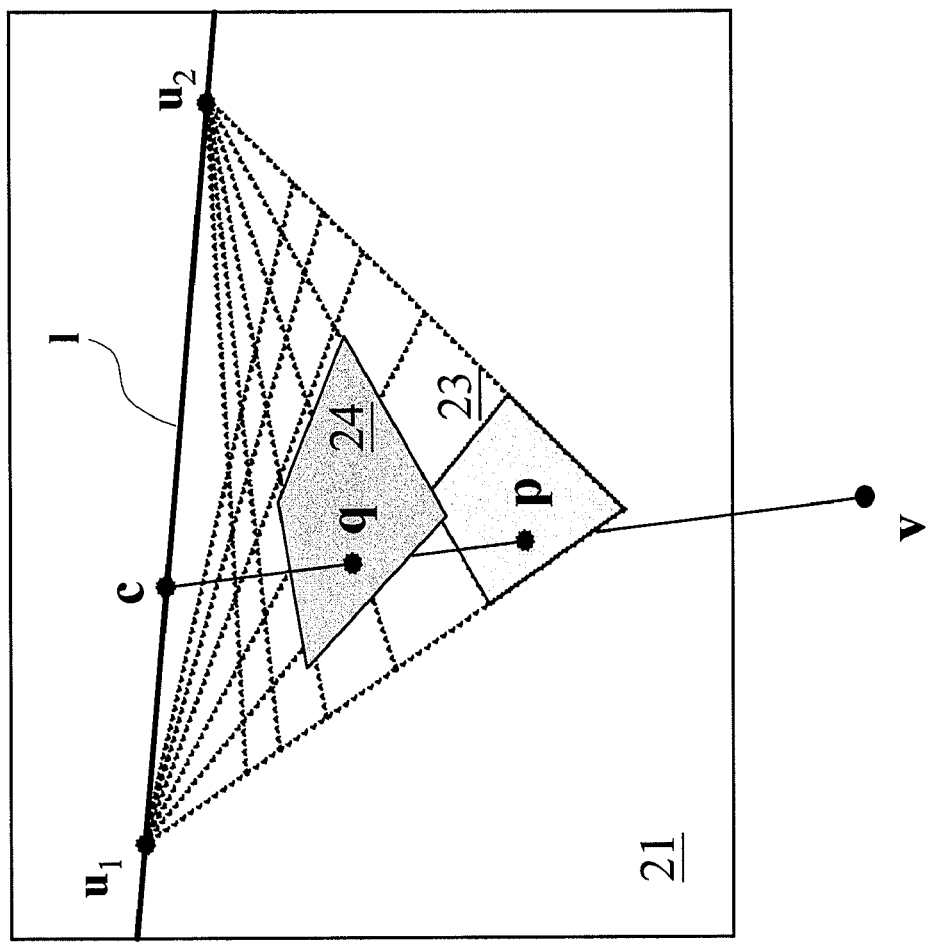
FIG. 2B is a schematic diagram illustrating an image plane of the camera illustrated in FIG. 2A.

FIG. 2B is a schematic diagram illustrating the image plane 21 of the camera O illustrated in FIG. 2A. Referring to FIG. 2B, also referring to FIG. 2A, vanishing points $u_1$ and $u_2$ on the vanishing line "l" may exist in the image plane 21 related to the FOV of the first camera O. Furthermore, another vanishing point "v" at infinity along the normal direction of the first plane 23 may also exist. A vanishing point may refer to a point in a perspective drawing to which parallel lines appear to converge, while a vanishing line may refer to a line connecting two or more vanishing points. In the present example, the vanishing line "l" passes through the vanishing points $u_1$ and $u_2$ and a point "c", at which another vanishing line passing through points v, p and q intersects the vanishing line "l". The points p and q correspond to projection of the points P and Q onto the image plane 21. Note that the points p, q, c and v, denoted in lower cases, are 2D points and colinear with respect to one another. The 3D points P, Q, C and V and the 2D points p, q, c and v may observe a relation expressed in Equation 3 below.

$$\frac{d(p, c) \times d(q, v)}{d(p, q) \times d(c, v)} = \frac{d(P, C) \times d(Q, V)}{d(P, Q) \times d(C, V)} \quad \text{Equation 3}$$

Wherein d(i, j) and d(I, J) respectively denote a distance (in pixels, for example) between points i and j and points I and J. Since V is a point at infinity, it may be identified that $$\frac{d(Q, V)}{d(C, V)} = 1.$$

By setting $a_1 = d(p, c)$, $a_2 = d(p, v)$ and $a_3 = d(c, v)$, given the height of the object in the image plane 21 being $h = d(p, q)$, the above Equation 3 may de rewritten in Equation 4 as follows.

$$\frac{a_1 \times (a_2 + h)}{h \times a_3} = \frac{Z}{K} \quad \text{Equation 4}$$

From the above Equation 4, it may be found that if the vanishing points $u_1$, $u_2$ and v in the image plane 21 are provided, given the height K and the bottom point p and top point q on the image plane 21, the level "Z" of the camera O from the first plane 23 may be calculated. Similarly, if the vanishing points $u_1$, $u_2$ and v in the image plane 21 are provided, given the level "Z" of the camera O and the bottom point p and top point q on the image plane 21, the height "K" of the object may be calculated.

To provide a desirable image processing, it may be necessary to take the depth-of-field issue into account in identifying 3D points or 3D coordinates. Examples of the present invention may provide methods and systems for video image processing in a multiview environment. According to the present invention, a ground plane within the FOV of a set of cameras including a first camera and a second camera may be used as a reference plane. Furthermore, given the reference plane, a homography matrix for conversion between projection points on projection ground planes in a first image of the first camera and a second image of the second camera may be determined. Moreover, based on the above-mentioned single-view geometry, the depth of view in the first and second images may be treated by identifying information on orientation and ratio of the height of objects in the first and second images. Accordingly, conversion between regions in the first and second images may be performed.

Figure 3A:
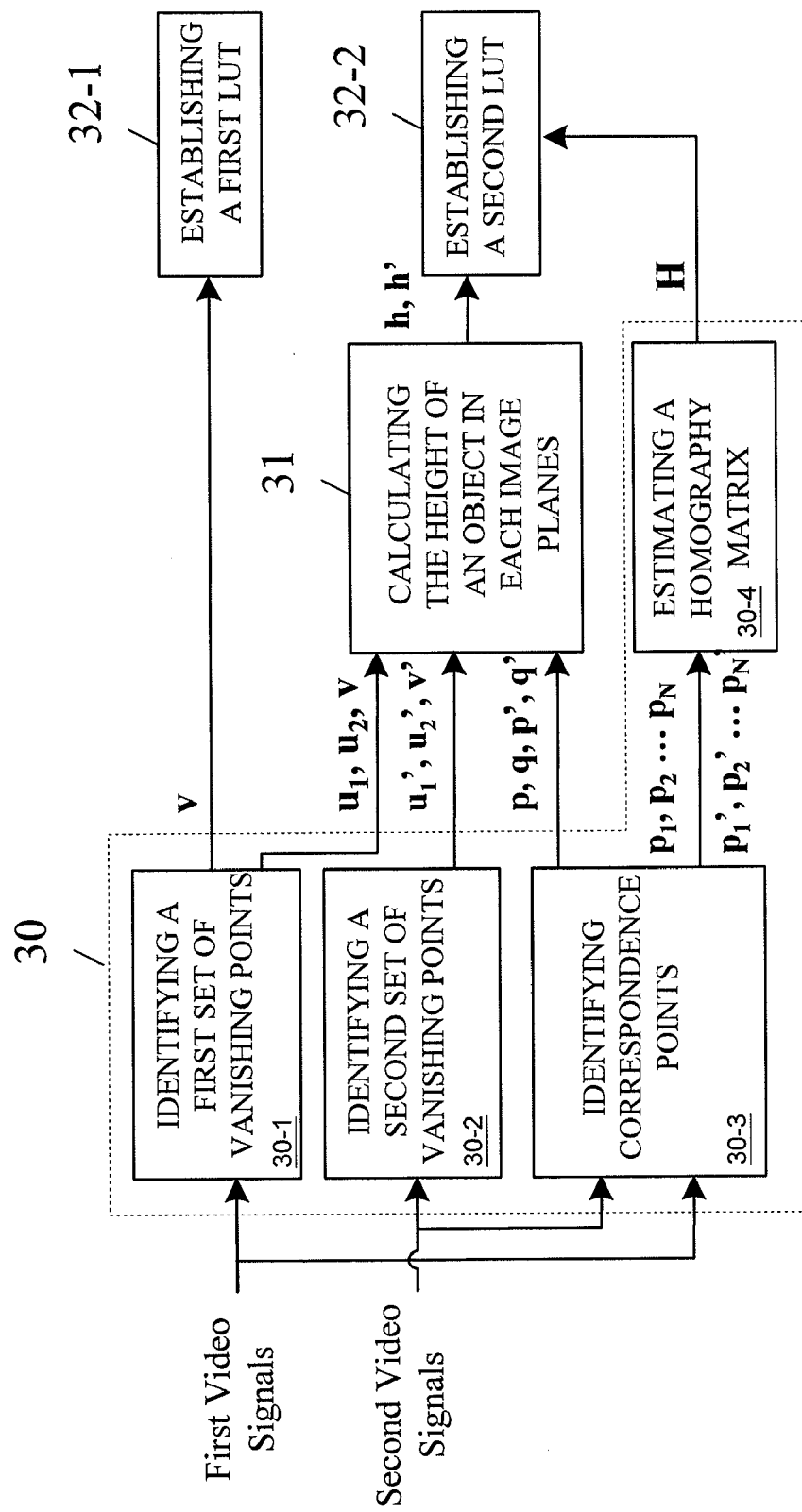
FIG. 3A is a diagram illustrating a method for image processing in a multiview video system consistent with an example of the present invention.
Figure 3B:
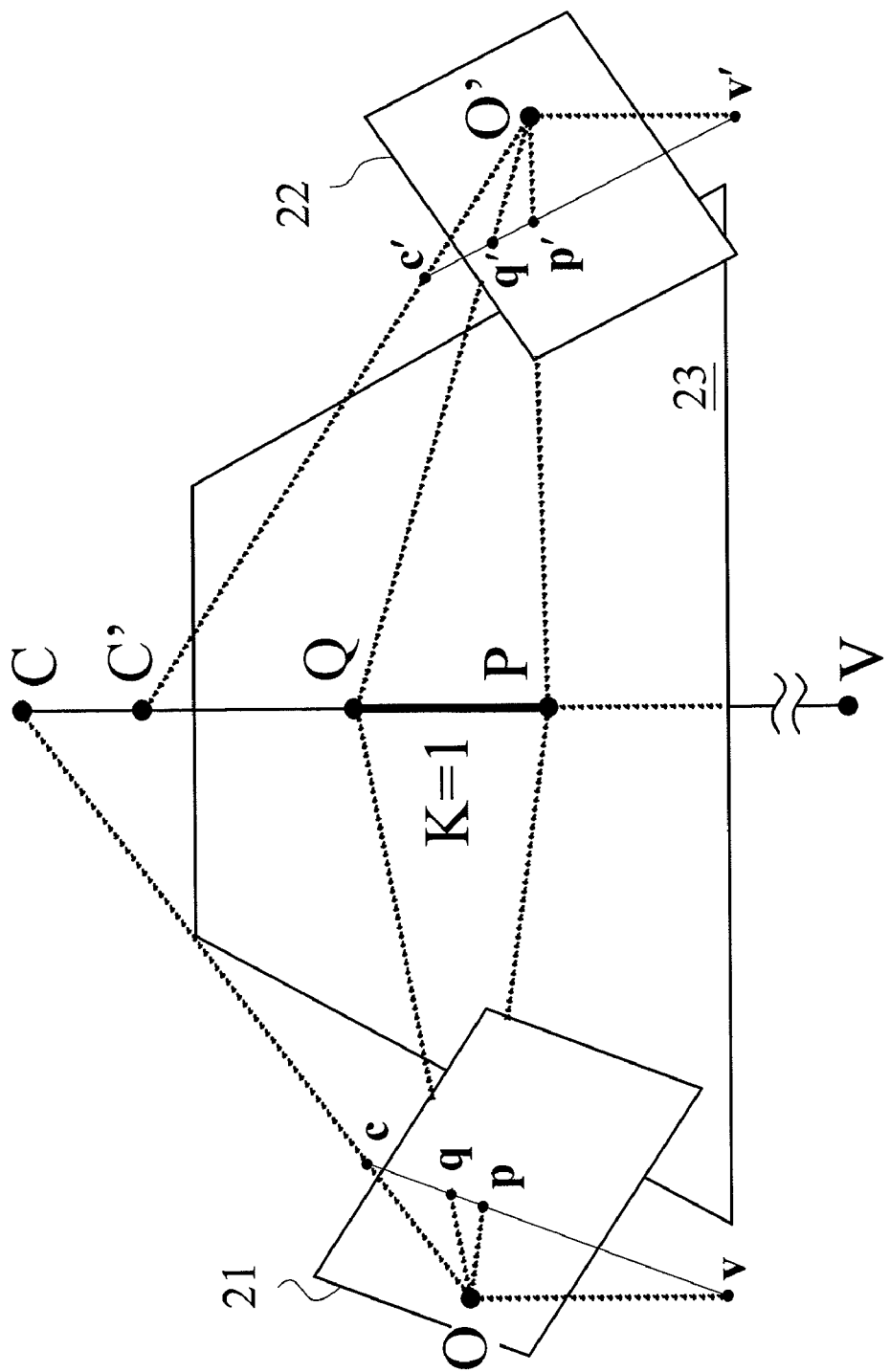
FIG. 3B is a schematic diagram illustrating the geometry related to multiple cameras in a multiview video system.

FIG. 3A is a diagram illustrating a method for image processing in a multiview video system consistent with an example of the present invention, and FIG. 3B is a schematic diagram illustrating the geometry related to multiple cameras in a multiview video system. Referring to FIG. 3A, at step 30, which further includes sub-steps 30-1 to 30-4, feature points in a first image 21, a second image 22 and a known ground plane 23 illustrated in FIG. 3B may be identified. The feature points may include vanishing points and correspondence points, which may be manually set by a system user or automatically detected in accordance with a suitable algorithm.

At step 30-1, also referring to FIG. 3B, a first set of vanishing points ($u_1$, $u_2$, v) for first video signals from a first camera O may be identified. The first video signals may be related to the first image 21 of the first camera O. The first camera may be held immobilized relative to the ground or reference plane 23 and have a first FOV. In one example, the first set of vanishing points ($u_1$, $u_2$, v) may be set by manually providing several 3D parallel lines in the first image plane 21 and then determining the converging points $u_1$, $u_2$ and v for the several 3D parallel lines. In another example, the first set of vanishing points ($u_1$, $u_2$, v) may be detected by, for example, a method disclosed in "Vanishing point detection without any a priori information" by A. Almansa, A. Desolneux, and S. Vamech, *IEEE Trans. Pattern Analysis and Machine Intelligence*, vol. 25, pp. 502-507, April 2003.

At step 30-2, a second set of vanishing points ($u_1'$, $u_2'$, v') for second video signals from a second camera O' may be identified in a fashion similar to the first set of vanishing points ($u_1$, $u_2$, v). Likewise, the second video signals may be related to the second image 22 of the second camera O'. The second camera O' may be held immobilized relative to the ground or reference plane 23 and have a second FOV, which may overlap the first FOV in an overlapped region.

At step 30-3, correspondence points may be identified. In one example, an object having a ground or bottom point P and a top point Q may be placed on the reference plane 23 within the overlapped region. The correspondence points may include projection points p and q in the first image plane 21 related to the first camera O and projection points p' and q' in the second image plane 22 related to the second camera O'. By manual setting or a suitable algorithm, the projection points p, q, p' and q' may be provided. Assuming that the height PQ (=K) of the object is 1, the level Z of the first camera O and the level Z' of the second camera O' from the reference plane 23 may be calculated in accordance with the above Equations 3 and 4. The correspondence points may further include a number of "N" ground points on the reference plane 23 and their projection $p_1$ to $p_N$ on the first image plane 21 and $p_1'$ to $p_N'$ on the second image plane 22.

At step 30-4, based on the correspondence points $p_1$ to $p_N$ and $p_1'$ to $p_N'$ related to the ground points, parameters such as the parameters $h_{11}$ to $h_{33}$ of a homography matrix may be identified and thus a homography matrix "H" for conversion between the first image plane 21 and the second image plane 22 may be established. In one example, a number of four (N=4) ground points on the reference plane 23 may be required to establish a homography matrix.

At step 31, based on the first set of vanishing points ($u_1$, $u_2$, v), the second set of vanishing points ($u_1'$, $u_2'$, v') and the correspondence points p, q, p' and q' related to the object, a height "h" (=pq) of a first projected object in the first image plane 21 and a height "h'" (=p'q') of a second projected object in the second image plane 22 may be identified, which is discussed below. Since the points p and p', corresponding to the bottom point P on the ground plane 23, are positioned respectively in the first image plane 21 and the second image plane 22, given the homography matrix H identified at step 30-3, the coordinates of p' may be identified using the function p'=H·p. With respect to the first camera O, since the first set of vanishing points ($u_1$, $u_2$, v) and the point p are identified, the coordinates of the point "c" may be identified, also referring to FIG. 2B. With respect to the second camera O', since the second set of vanishing points ($u_1'$, $u_2'$, v') and the point p' are identified, the coordinates of the point c' may be identified. By setting $a_1'$=d(p', c'), $a_2'=d(p', v')$ $and$ $a_3'$=d(c', v') for the second image plane 22, the height h' may be calculated in accordance with Equation 5 as follows.

$$K = \frac{a_3 \times h \times Z}{a_1 \times (a_2 + h)} = \frac{a_3' \times h' \times Z'}{a_1' \times (a_2' + h')} \quad \text{Equation 5}$$

By rearranging the above Equation 5 and replacing K with $$\frac{a_3 \times h \times Z}{a_1 \times (a_2 + h)},$$

Equation 6 may be obtained.

$$h' = \frac{K \times a_1' \times a_2'}{a_3' \times Z' - a_1 \times K} = \frac{\left(\frac{a_3 \times h \times Z}{a_1 \times (a_2 + h)}\right) \times a_1' \times a_2'}{a_3' \times Z' - a_1 \times \left(\frac{a_3 \times h \times Z}{a_1 \times (a_2 + h)}\right)} \quad \text{Equation 6}$$

Figure 4A:
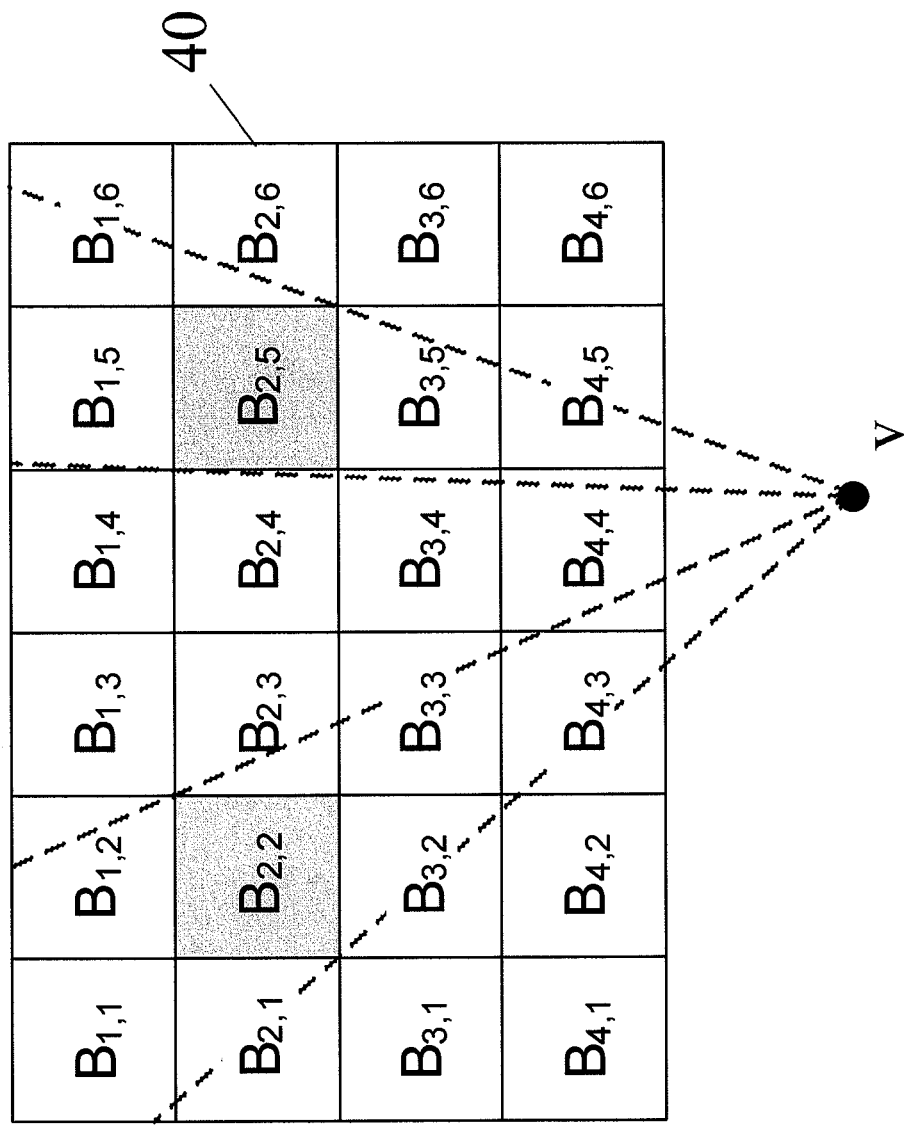
FIG. 4A is a diagram illustrating a method of identifying one or more region of interest (ROI) in an image consistent with an example of the present invention.

At step 32-1, based on the vanishing point "v" identified at step 31, a first lookup table (LUT) may be established, which will be described with reference to FIGS. 4A and 4B.

Figures 2, 3C:
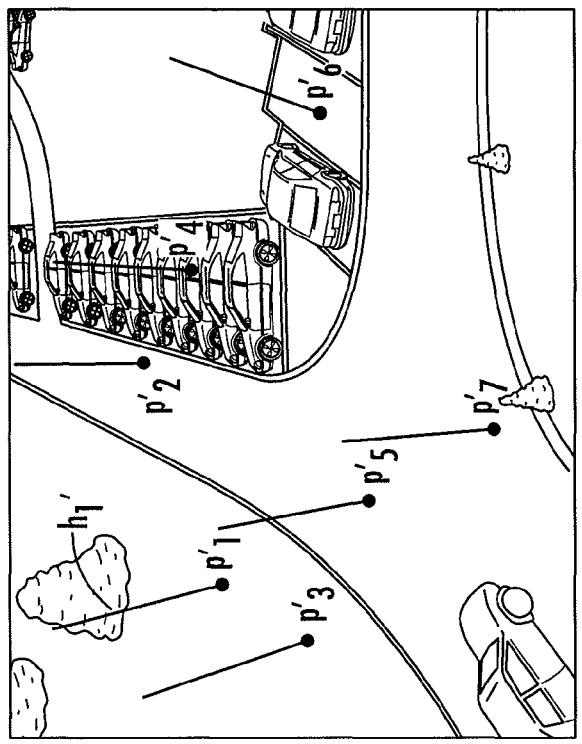
Figures 1, 3C:
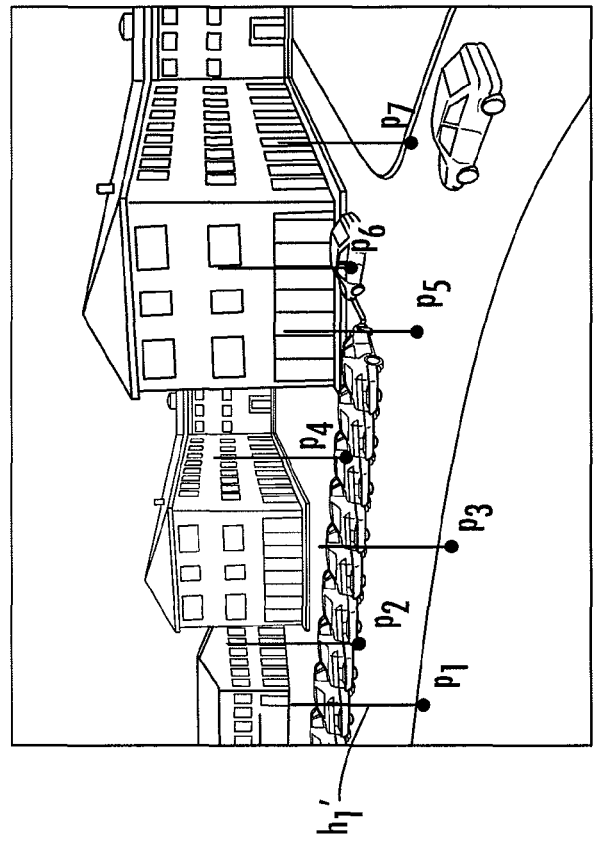

FIGS. 3C-1 and 3C-2 are diagrams illustrating the heights of an object on a ground plane projecting to image planes. Referring to FIG. 3C-1, given the first set of vanishing points ($u_1$, $u_2$, v) and projected ground points $p_1$ to $p_7$, the heights (only a representative height $h_1$ is shown) of the points $p_1$ to $p_7$ in the first image plane 21 may be identified, assuming K=1. Furthermore, referring to FIG. 3C-2, given the first set of vanishing points ($u_1$, $u_2$, v), the second set of vanishing points ($u_1'$, $u_2'$, v') and projected ground points $p_1'$ to $p_7'$, the heights (only a representative height $h_1'$ is shown) of the points $p_1'$ to $p_7'$ in the second image plane 22 may be identified, assuming K=1.

Figures 2, 3D:
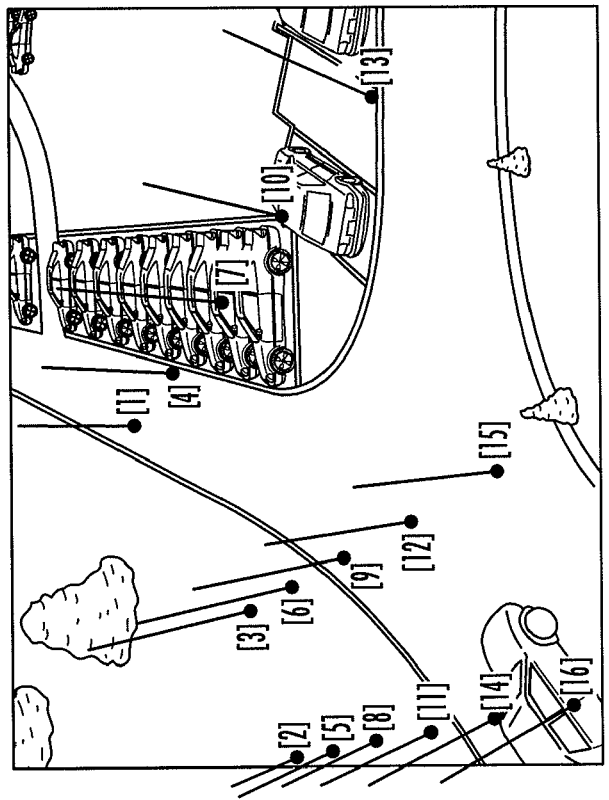
Figures 1, 3D:
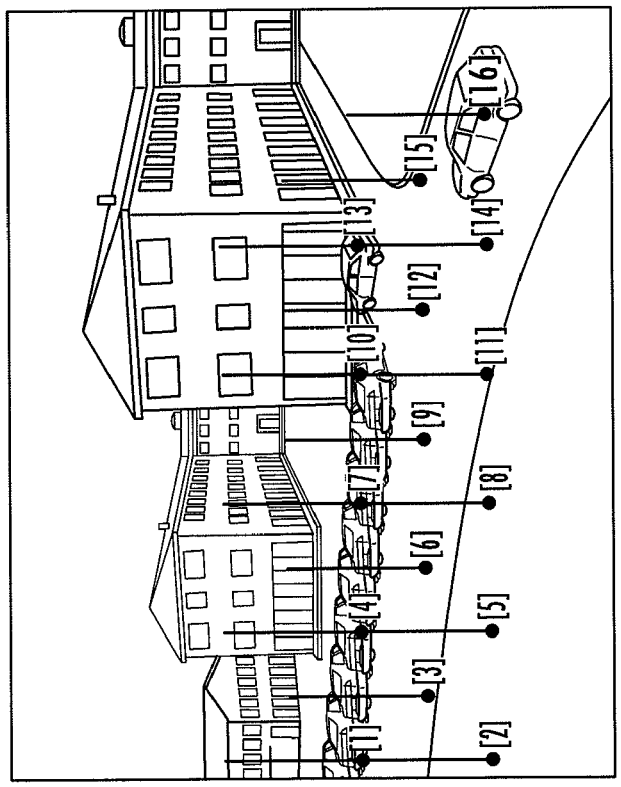

Referring again to FIG. 3A, at step 32-2, based on the information on the vanishing points ($u_1$, $u_2$, v) and ($u_1'$, $u_2'$, v'), the correspondence points p, q, p' and q' and the heights h and h', a second LUT may be established. In a multiview video system, a region of interest (ROI) for an image may not be fixed. As a result, it may be complicated and time-consuming to calculate the height h' based on the above Equation 6 in real time for each points in an ROI. The second LUT may facilitate the identification of the vanishing points ($u_1'$, $u_2'$, v'), the point p' and the height h' for the second camera O'. FIGS. 3D-1 and 3D-2 are diagrams illustrating inputs and outputs of the second LUT established in accordance with an example of the present invention. Referring to FIG. 3D-1, a first set of information on a projected ground point p(x, y) and a height "h" for each of ROIs [1] to [16] in a first image, which may be identified at steps 30-1 to 30-4, may serve as inputs for the second LUT. Referring to FIG. 3D-2, by indexing the second LUT with one of the inputs, one of a second set of information on p'(x', y') and h' for each of the ROIs [1] to [16] in a second image may be generated. The second LUT may include but is not limited to a 3D LUT. Furthermore, the second LUT may be established offline. That is, the first camera O and the second camera O' may not be put into practical use for surveillance purpose until the second LUT is established.

Given an image having $N_w$ columns and $N_h$ rows in blocks, the height h or h' for any projection object in the image may be smaller than or equal to $(N_w^2+N_h^2)^{0.5}$. Given an image of 384×288 (pixels), a number of 432 blocks each sizing 16×16 pixels may be provided. The height h or h' may be smaller than approximately 54.1 such blocks. The value of height may vary to fit different applications.

The first LUT in FIG. 3A may be used to distinguish one or more object from one other in an image. FIG. 4A is a diagram illustrating a method of identifying one or more region of interest (ROI) in an image consistent with an example of the present invention. In a multiview video system, an image may include more than one ROI and an ROI may include more than one object of interest. It may therefore be desirable to transform an ROI or ROIs in a first image to another ROI or ROIs in a second image. Referring to FIG. 4A, an image 40 may be divided into a number of blocks $B_{1,1}$ to $B_{4,6}$. Each of the blocks $B_{1,1}$ to $B_{4,6}$, which may include but is not limited to 16×16 pixels, may be common to the vanishing point v, which may be identified at step 30-1 in FIG. 3A. Taking the blocks $B_{2,2}$ and $B_{2,5}$ for example, where one or more motion object may be detected, diagonal corner points (not numbered) of each of the blocks $B_{2,2}$ and $B_{2,5}$ may intersect projecting lines from the vanishing point v. The projecting lines may pass through other blocks in the ROI. For example, the projecting lines may pass the blocks $B_{3,2}$, $B_{3,3}$ and $B_{4,3}$. These blocks $B_{2,2}$, $B_{3,2}$, $B_{3,3}$ and $B_{4,3}$ may be related to a first object of interest, and may altogether form a first ROI of the image 40. Furthermore, the block $B_{2,5}$, $B_{3,5}$ and $B_{4,5}$ may be related to a second object of inter may altogether form a second ROI of the image 40. An ROI may refer to a contiguous region in an image and may include at least one block contiguous with one another.

To identify whether the blocks $B_{2,2}$, $B_{3,2}$, $B_{3,3}$ and $B_{4,3}$ are related, in one example, a predetermined threshold may be set. The threshold may include a ratio of the area of a block within related projecting lines to the area of the block outside the related projecting lines. In the present example, the ratio of the block $B_{3,3}$ may be greater than that of the block $B_{3,2}$.

Accordingly, the block $B_{3,3}$ may be assigned a first degree of relevance to the block $B_{2,2}$ and the block $B_{3,2}$ may be assigned a second degree of relevance to the block $B_{2,2}$, wherein the first degree may be higher than the second degree, which means that the block $B_{3,3}$ may be more likely to be related to the block $B_{2,2}$ than the block $B_{3,2}$.

Figure 4B:
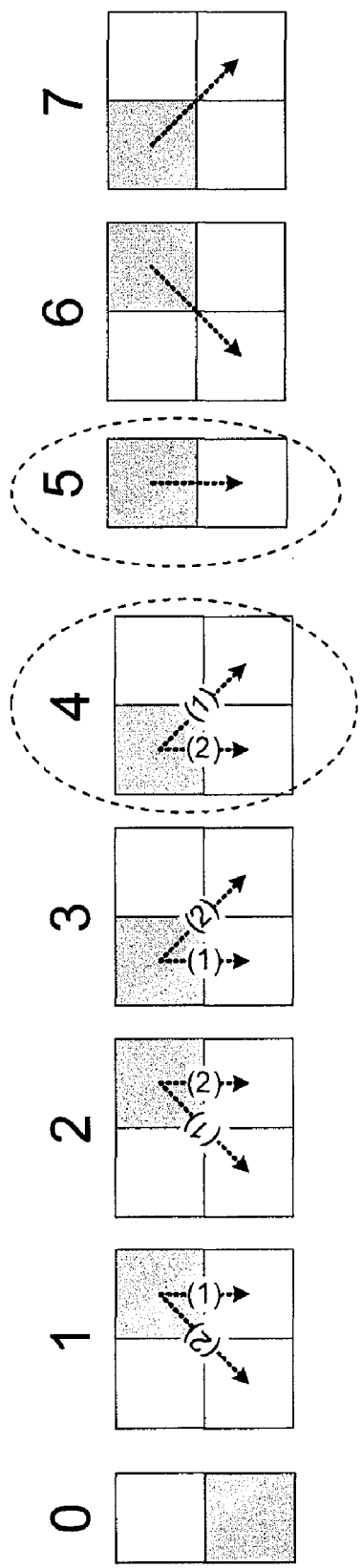
FIG. 4B is a schematic diagram illustrating a method of assigning attribute values to regions of different types in an image consistent with an example of the present invention.

FIG. 4B is a diagram illustrating a method of assigning attribute values to regions of different types in an image consistent with an example of the present invention. Referring to FIG. 4B, for a block at issue (shown in shadow) and its relevant block(s), if any, an attribute value ranging from 0 to 7 may be assigned. Taking the blocks $B_{2,2}$ and $B_{2,5}$ for example, the block $B_{2,2}$ may be given an attribute value of "4", as illustrated in the left dashed circle, because the block $B_{2,2}$ has a first-degree-relevance (denoted (1)) block $B_{3,3}$ in the diagonal direction and a second-degree-relevance (2) block $B_{3,2}$ in the vertical direction relative to the vanishing point v. Furthermore, the block $B_{2,5}$ may be given an attribute value of "5", as illustrated in the right dashed circle, because the block $B_{2,5}$ has a relevance block $B_{3,5}$ in the vertical direction relative to the vanishing point v. Note that only one block $B_{3,5}$ may be related to the block $B_{2,5}$ because the ratio of the block $B_{4,5}$ may fall below a predetermined threshold. The first LUT may include but is not limited to a 2D LUT, wherein the coordinates (x, y) of each of the blocks $B_{1,1}$ to $B_{4,6}$ may serve as an input and an attribute value may be generated for an output. Furthermore, similar to the second LUT, the first LUT may be established offline.

Figure 5A:
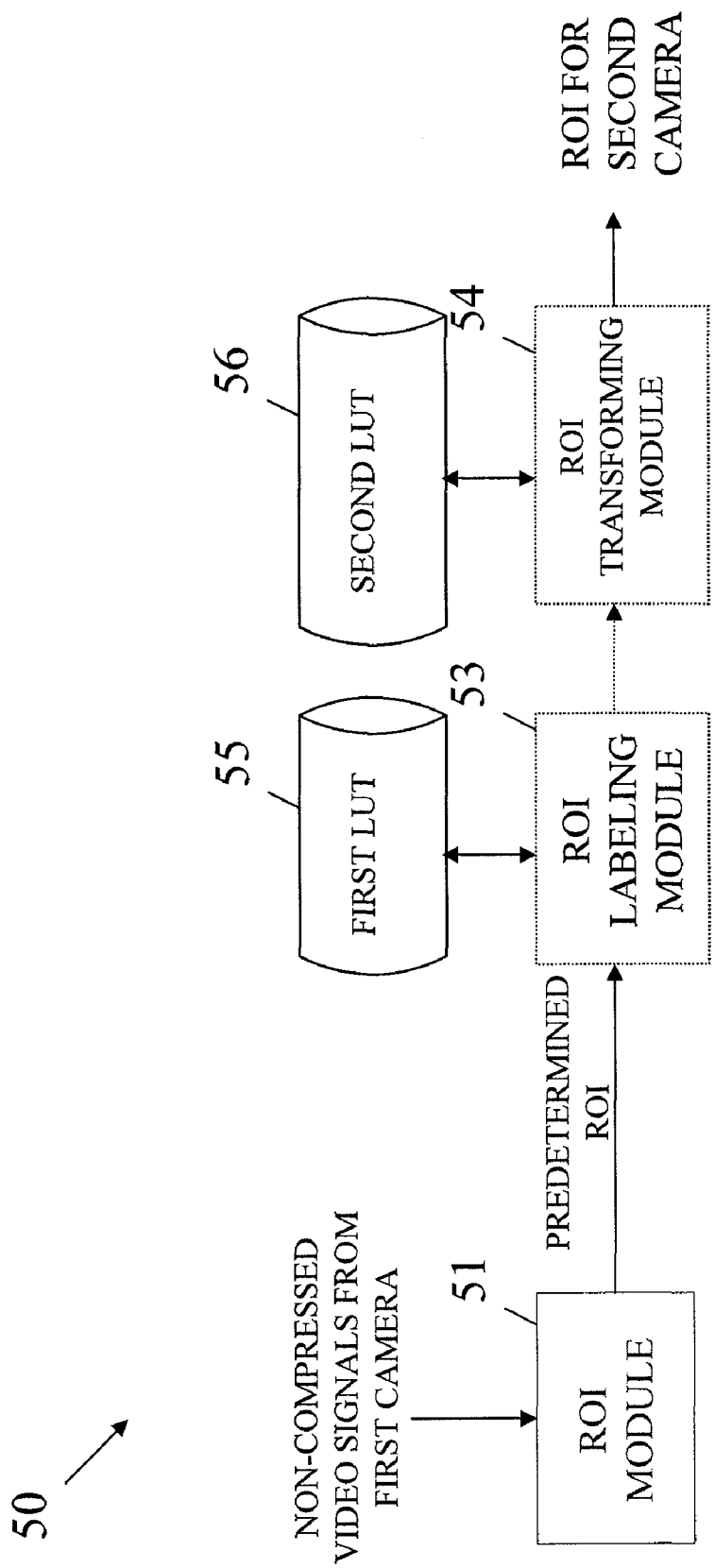
FIG. 5A is a schematic diagram of a system for image processing consistent with an example of the present invention.

FIG. 5A is a schematic diagram of a system 50 for image processing consistent with an example of the present invention. Referring to FIG. 5A, the system 50 may include a region of interest (ROI) module 51, an ROI labeling module 53, an ROI transforming module 54, a first LUT 55 and a second LUT 56. In one example, an ROI may be predetermined or defined by a user of the system 50. The ROI module 51 may be configured to identify the type of video signals from a first camera. In the present example, the ROI module 51 may identify non-compressed video signals from the first camera and the non-compressed video signals may be related to at least one predetermined ROI, for example, a corridor, passage or driveway. The at least one predetermined ROI may be manually set by a system user and may each occupy a relatively large region in an image.

The ROI labeling module 53 may be configured to divide each of at least one ROI into blocks with index numbers (i, j), for example, blocks $B_{1,1}$ to $B_{i,j}$. An attribute value of each of the blocks $B_{1,1}$ to $B_{i,j}$ may be obtained from the first LUT 55. The ROI labeling module 53 may then identify whether a block in one of the at least one ROI is related to an object. Furthermore, the ROI labeling module 53 may identify in each of the at least one ROI a point p that is most close to a vanishing point v and a point q that is most remote to the vanishing point v, thereby identifying the height h of a projection object. In one example, the coordinates of p and q in each of the at least one ROI may be recorded during labeling so that the height h in the each ROI may be identified when the labeling is complete. Based on a first set of information on the coordinates p(x, y) and the height h from the ROI labeling module 53, the ROI transforming module 54 may provide coordinates p'(x', y') and the height h' for the second camera by indexing the second LUT with the first set of information.

Figure 5B:
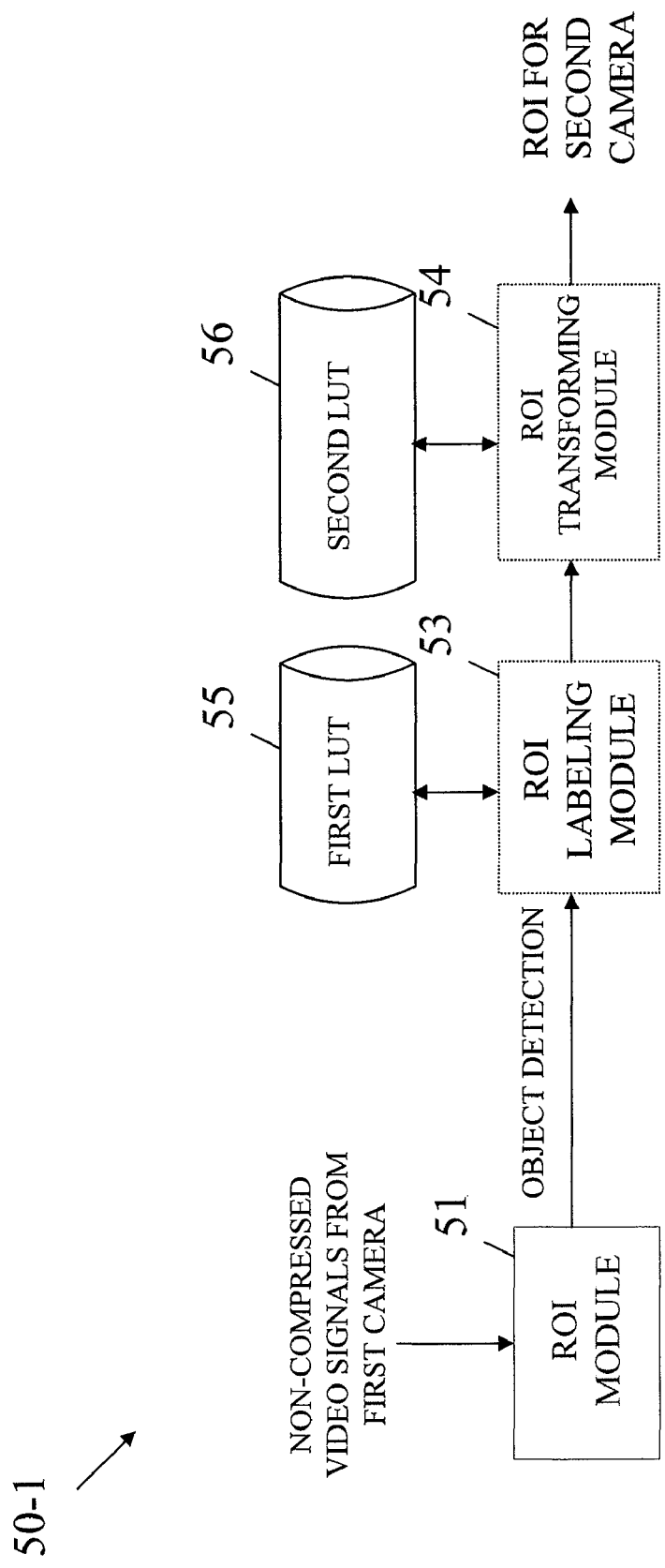
FIG. 5B is a schematic diagram of a system for image processing consistent with another example of the present invention.

FIG. 5B is a schematic diagram of a system 50-1 for image processing consistent with another example of the present invention. Referring to FIG. 5B, the system 50-1 may be similar to the system 50 described and illustrated with reference to FIG. 5A except that, for example, the ROI module 51 may identify non-compressed video signals from the first camera and the non-compressed video signals may be related to a moving region such as a man or a vehicle in the image. The ROI module 51 may generate one or more ROI in pixels. In one example, the ROI module 51 may convert the one or more pixel-form ROI into block-form ROI. The ROI module 51 may generate one or more ROI in pixels. In one example, the ROI module 51 may convert the one or more pixel-form ROI into block-form ROI.

Figure 5C:
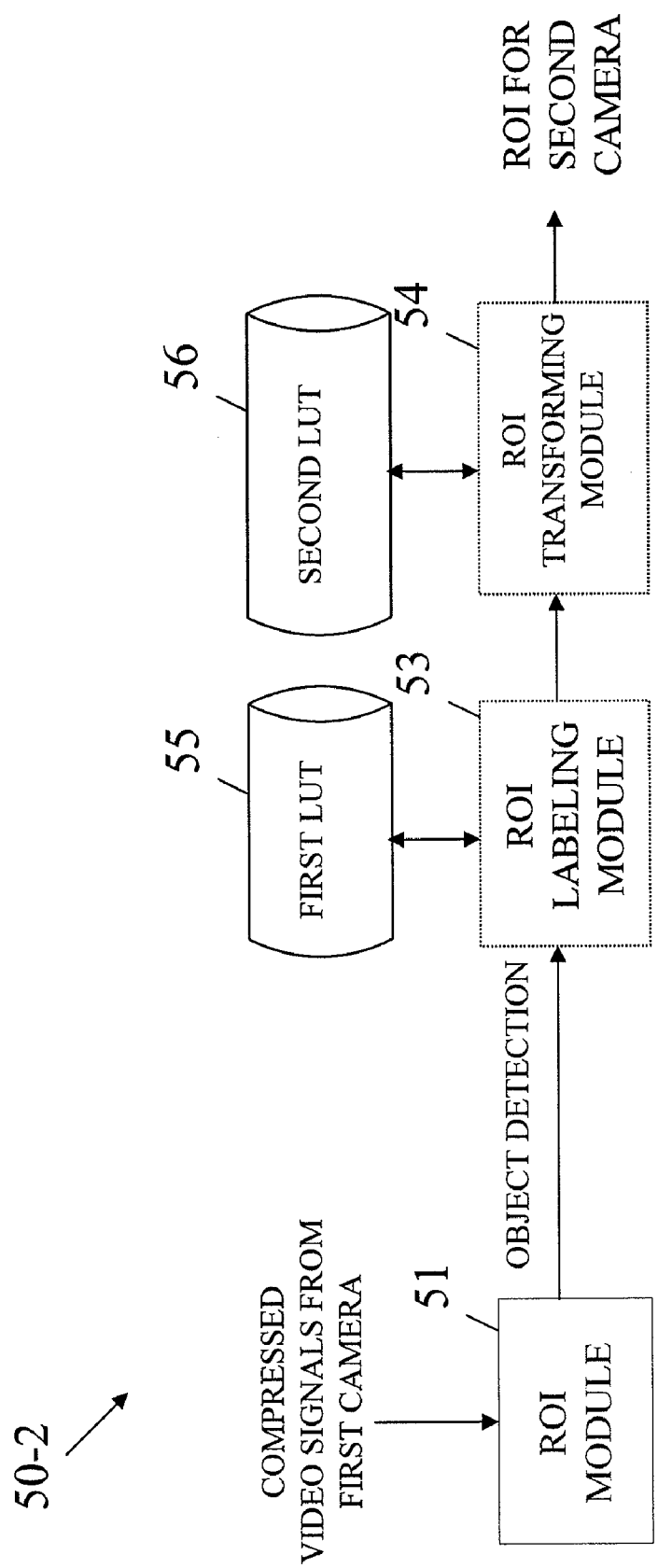
FIG. 5C is a schematic diagram of a system for image processing consistent with still another example of the present invention.

FIG. 5C is a schematic diagram of a system 50-2 for image processing consistent with still another example of the present invention. Referring to FIG. 5C, the system 50-2 may be similar to the system 50 described and illustrated with reference to FIG. 5A except that, for example, the ROI module 51 may identify compressed video signals from the first camera and the compressed video signals may be related to a moving region in the image. The ROI module 51 may generate one or more block-form ROI such as the ROI illustrated in FIG. 6A.

The ROI module 51, the ROI labeling module 53 and the ROI transforming module 54 may be implemented in hardware or software, in which the former may be more advantageous in view of operation speed while the latter may be more cost effective in view of design complexity. Either implemented in hardware or software, the modules 51, 53 and 54 in one example may be incorporated into an integrated circuit (IC) or chip.

In one example, the non-compressed video signals from the first camera may be provided using techniques such as background subtraction, temporal differencing and optical flow. The background subtraction approach may include a learning phase and a testing phase. During the learning phase, a plurality of pictures free of foreground objects may be collected and used as a basis to establish a background model. Pixels of the background model may generally be described in a simple Gaussian Model or Gaussian Mixture Model. In general, a smaller Gaussian model value may be assigned to a pixel that exhibits a greater difference in color or grayscale level from the background image, while a greater Gaussian model value may be assigned to a pixel that exhibits a smaller difference in color or grayscale level from the background image. Furthermore, the temporal differencing approach may directly subtract pictures taken at different timings. A pixel may be identified as a foreground pixel of a foreground object if the absolute value of a difference at the pixel point between the pictures exceeds a threshold. Otherwise, the pixel may be identified as a background pixel. Moreover, the optical flow approach, based on the theory that optical flow changes when a foreground object moves into background, may calculate the amount of displacement between frames for each pixel of an image of a moving object, and determine the position of the moving object.

In one example, the compressed video signals from the first camera may use DC prediction, AC prediction, macroblock prediction or motion estimation. Furthermore, available techniques for the ROI module 51 to identify a moving region may include, for example, the techniques disclosed in "A hierarchical human detection system in (un)compressed domains" by I. B. Ozer and W. H. Wolf, *IEEE Trans. Multimedia*, vol. 4, pp. 283-300, June 2002 and "Performance evaluation of object detection algorithms for video surveillance" by J. C. Nascimento and J. S. Marques, *IEEE Trans. Multimedia*, vol. 8, pp. 761-774, August 2006.

Figure 6B:
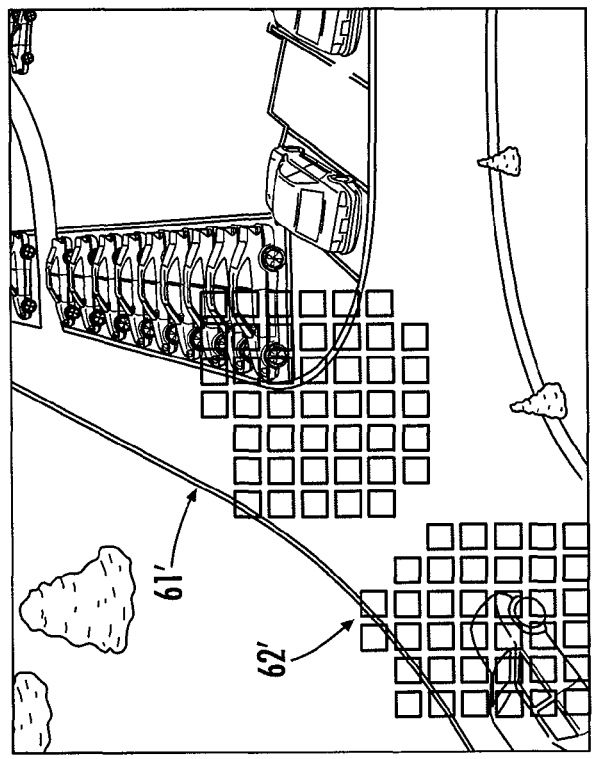
FIGS. 6A and 6B are diagrams showing results of transformation.
Figure 6A:
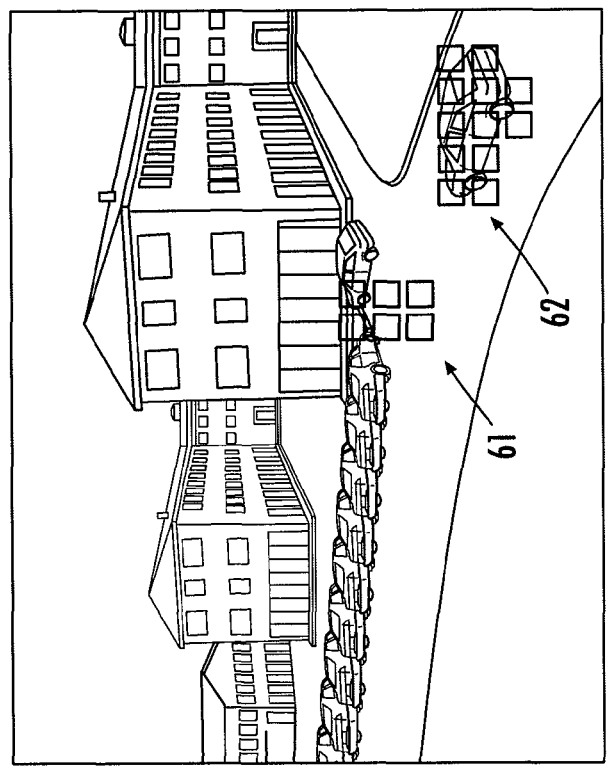

FIGS. 6A and 6B are diagrams showing results of transformation. Referring to FIG. 6A, a first ROI 61 and a second ROI 62 in a first image from a first camera may in total include 18 blocks. After ROI transformation, referring to FIG. 6B, ROIs 61' and 62' in a second image of a second camera may in total include 81 blocks. The number of blocks in a transformed ROI may be related to the positioning of the second camera including, for example, angle and distance relative to a reference plane.

Figure 7:
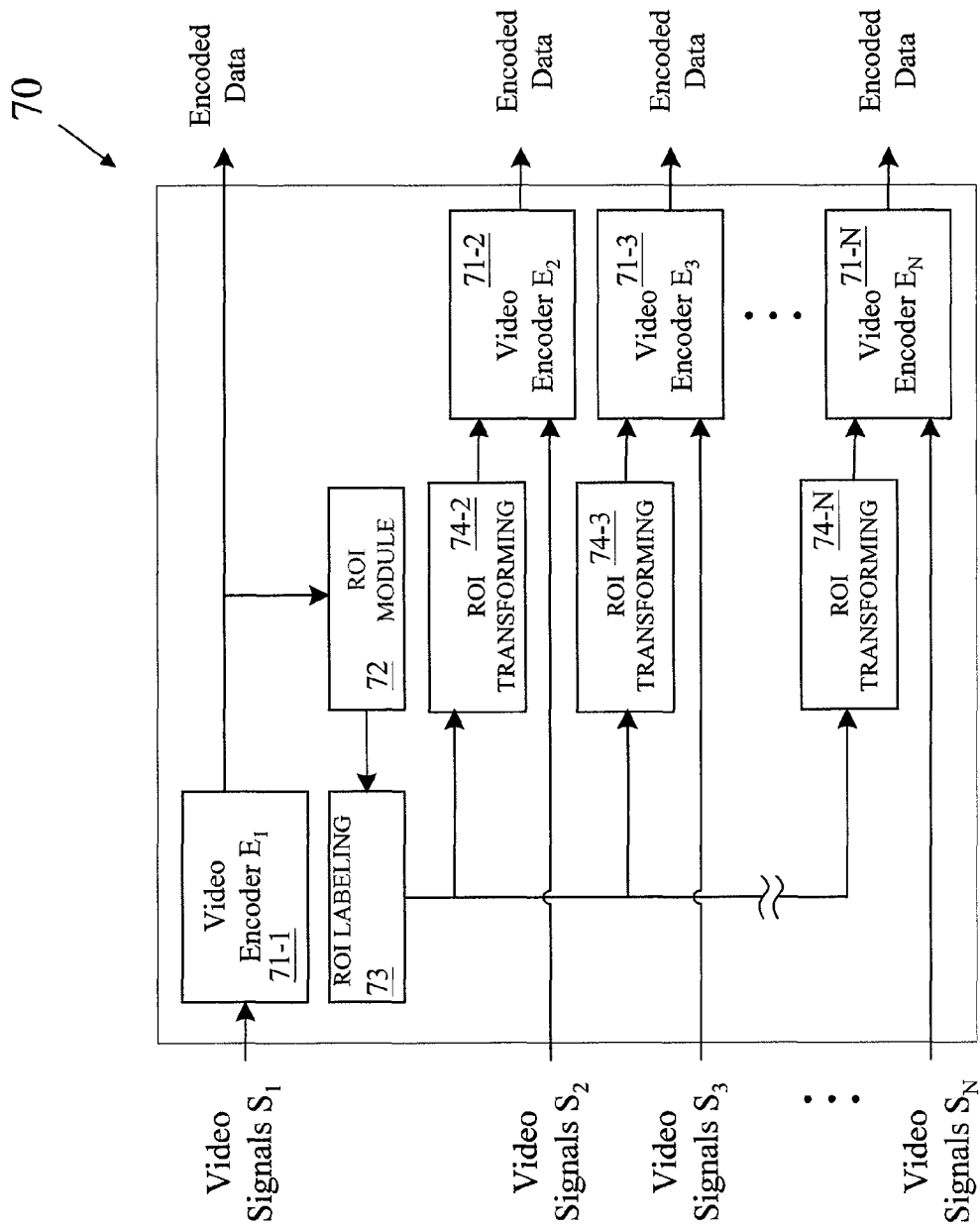
FIG. 7 is a schematic block diagram of a system for image processing consistent with an example of the present invention.

FIG. 7 is a schematic block diagram of a system 70 for image processing consistent with an example of the present invention. Referring to FIG. 7, the system 70 may include a number of N video encoders 71-1 to 71-N, an ROI module 72, an ROI labeling module 73, and a number of (N-1) ROI transformers 74-2 to 74-N. In operation, video signals $S_1$ to $S_N$ from a number of N cameras having overlapped FOVs may be fed to the video encoders 71-1 to 71-N, respectively. The video signals $S_1$ may be encoded at the video encoder 71-1 and an encoded form of the video signals $S_1$ may be provided for output. The encoded video signals $S_1$ may also be provided to the ROI module 72 and then to the ROI labeling module 73, which in turn may generate a first set of information on p(x, y) and h related to an ROI in a first image plane as discussed in the previous examples. Based on the first set of information, a second set of information on p'(x', y') and h' for each of the other cameras may be obtained at each of the ROI transforming modules 74-2 to 74-N with the help of an LUT such as the LUT 56, which may include information on transformation for each of the other cameras with different FOVs from the first camera. In the encoders 71-2 to 71-N, for regions other than an ROI in each of video frames $S_2$ to $S_N$, a motion estimation (ME) process for a temporal model may be eliminated so as to reduce computation load image, and a quantization parameter (QP) process for a spatial model may be eliminated so as to alleviate encoding load. Furthermore, for an ROI region in each of video frames $S_2$ to $S_N$, a QP value for the QP process may be decreased so that video quality may be improved.

It will be appreciated by those skilled in the art that changes could be made to the preferred embodiments described above without departing from the broad inventive concept thereof. It is understood, therefore, that this invention is not limited to the particular embodiments disclosed, but is intended to cover modifications within the spirit and scope of the present application as defined by the appended claims.

Further, in describing certain illustrative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. An apparatus for image processing in a multiview video environment comprising:
one or more processors; and
one or more memories including software configured to, with the one or more processors, cause the apparatus to perform at least the following:
receive first video signals from a first camera and detect at least one region of interest (ROI) in a first image related to the first video signals;
utilize a first lookup table to generate an attribute value in response to a type of a block, wherein the type of a block is related to a first vanishing point defined in the first image;
identify a first point "p" most close to the first vanishing point, a second point "q" most remote to the first vanishing point and a length "h" between the first point "p" and the second point "q" in each of the at least one ROI, and generate first information on p, q and h;
utilize a second lookup table to generate second information on p', q' and h' in response to the first information, wherein p' is a first point most close to a second vanishing point defined in a second image related to a second camera, q' is a second point most remote to the second vanishing point and h' is a length between the first point p' and the second point q' in each of at least one ROI in the second image; and
transform each of the at least one ROI in the first image into an ROI in the second image based on the second lookup table.

2. The apparatus of claim 1, wherein the identify of p, q and h and generate the first information of p, q and h, further causes the apparatus to:
divide each of the at least one ROI in the first image into a number of blocks; and assign an attribute value to the blocks in each of the at least one ROI in the first image based on the first lookup table.

3. The apparatus of claim 1, wherein the identify of p, q and h and generate the first information of p, q and h, further causes the apparatus to:
identify the number of blocks related to an object in one of the at least one ROI in the first image.

4. The apparatus of claim 1, wherein the one or more memories and software are configured to, with the one or more processors, cause the apparatus to:
utilize the second lookup table to generate third information on p", q" and h" in response to the first information, wherein p" is a first point most close to a third vanishing point defined in a third image related to a third camera, q" is a second point most remote to the second vanishing point and h" is a length between the first point p" and the second point q" in each of at least one ROI in the third image.

5. The apparatus of claim 1, wherein the first video signals include one of non-compressed video signals and compressed video signals.

6. A system for image processing in a multiview video environment, the system comprising:
a number of cameras $C_1$ to $C_N$, N being a positive integer;
an apparatus comprising one or more processors and one or more memories including software configured to, with the one or more processors, cause the apparatus to perform at least the following:
receive first video signals from the camera $C_1$ and detect at least one ROI in a first image related to the first video signals;
utilize a first lookup table to generate an attribute value in response to a type of a block, wherein the type of a block is related to a first vanishing point defined in the first image;
identify a first point "p" most close to the first vanishing point and a second point "q" most remote to the first vanishing point and a length "h" between the first point "p" and the second point "q" in each of the at least one ROI, and generate first information on p, q and h;

utilize a second lookup table to generate second information on p', q' and h' in response to the first information, wherein p' is a first point most close to a second vanishing point defined in a second image related to each of the cameras $C_2$ to $C_N$, q' is a second point most remote to the second vanishing point and h' is a length between the first point p' and the second point q' in each of at least one ROI in the second image; and receive the first information and transform each of the at least one ROI in the first image into an ROI in the second image related to each of the cameras $C_2$ to $C_N$ based on the second lookup table.

7. The system of claim 6, wherein the identify of p, q and h and generate the first information of p, q and h, further causes the apparatus to:

divide each of the at least one ROI in the first image into a number of blocks and assign an attribute value to the blocks in each of the at least one ROI in the first image based on the first lookup table.

8. The system of claim 6, wherein the identify of p, q and h and generate the first information of p, q and h, further causes the apparatus to:

identify the number of blocks related to an object in one of the at least one ROI in the first image.

9. The system of claim 6 further comprising a number of video encoders $E_1$ to $E_N$ to respectively receive video signals from the cameras $C_1$ to $C_N$.

10. The system of claim 6, wherein the first video signals include one of non-compressed video signals and compressed video signals.

11. A method for image processing in a multiview video environment including a first camera and a second camera, the method comprising:

receiving first video signals from the first camera;

identifying at least one region of interest (ROI) in a first image related to the first video signals;

configuring a first lookup table, wherein the first lookup table generates an attribute value in response to a type of a block, wherein the type of a block is related to a first vanishing point defined in the first image;

identifying a first point "p" most close to the first vanishing point, a second point "q" most remote to the first vanishing point and a length "h" between the first point "p" and the second point "q" in each of the at least one ROI, and generating first information on p, q and h;

configuring a second lookup table, wherein the second lookup table generates second information on p', q' and h' in response to the first information, wherein p' is a first point most close to a second vanishing point defined in a second image related to the second camera, q' is a second point most remote to the second vanishing point and h' is a length between the first point p' and the second point q' in each of at least one ROI in the second image; and transforming each of the at least one ROI in the first image into an ROI in the second image based on the second lookup table.

12. The method of claim 11, wherein the identifying of p, q and h and generating the first information of p, q and h, further comprising dividing each of the at least one ROI in the first image into a number of blocks and assign an attribute value to the blocks in each of the at least one ROI in the first image based on the first lookup table.

13. The method of claim 11, wherein the identifying of p, q and h and generating the first information of p, q and h, further comprising identifying the number of blocks related to an object in one of the at least one ROI in the first image.

14. The method of claim 11 further comprising: utilize the second lookup table to generate third information on p", q" and h" in response to the first information, wherein p" is a first point most close to a third vanishing point defined in a third image related to a third camera, q" is a second point most remote to the second vanishing point and h" is a length between the first point p" and the second point q" in each of at least one ROI in the third image.

15. The method of claim 11, wherein the first video signals include one of non-compressed video signals and compressed video signals.

16. A method for image processing in a multiview video environment, the method comprising:

providing a number of cameras $C_1$ to $C_N$, N being a positive integer;

receiving first video signals from the camera $C_1$;

detect at least one region of interest (ROI) in a first image related to the first video signals;

configuring a first lookup table, wherein the first lookup table generates an attribute value in response to a type of a block, wherein the type of a block is related to a first vanishing point defined in the first image;

identifying a first point "p" most close to the first vanishing point and a second point "q" most remote to the first vanishing point and a length "h" between the first point "p" and the second point "q" in each of the at least one ROI, and generate first information on p, q and h;

configuring a second lookup table, wherein the second lookup table generates second information on p', q' and h' in response to the first information, wherein p' is a first point most close to a second vanishing point defined in a second image related to each of the cameras $C_2$ to $C_N$, q' is a second point most remote to the second vanishing point and h' is a length between the first point p' and the second point q' in each of at least one ROI in the second image; and receiving the first information and transforming each of the at least one ROI in the first image into an ROI in the second image related to each of the cameras $C_2$ to $C_N$ based on the second lookup table.

17. The method of claim 16, wherein the identifying of p, q and h and generating the first information of p, q and h, further comprising dividing each of the at least one ROI in the first image into a number of blocks and assign an attribute value to the blocks in each of the at least one ROI in the first image based on the first lookup table.

18. The method of claim 16, wherein the identifying of p, q and h and generating first information of p, q and h, further comprising identifying the number of blocks related to an object in one of the at least one ROI in the first image.

19. The method of claim 16 further comprising a number of video encoders $E_1$ to $E_N$ to respectively receive video signals from the cameras $C_1$ to $C_N$.

20. The method of claim 16, wherein the first video signals include one of non-compressed video signals and compressed video signals.

* * * * *

UNITED STATES PATENT AND TRADEMARK OFFICE
CERTIFICATE OF CORRECTION

PATENT NO. : 8,264,542 B2
APPLICATION NO. : 12/204163
DATED : September 11, 2012
INVENTOR(S) : Lee et al.

It is certified that error appears in the above-identified patent and that said Letters Patent is hereby corrected as shown below:

Title page,
Item (57) ABSTRACT,
Line 4, "a value responsive to block type" should read --a value responsive to a block type--.

Column 8,
Line 58, "object of inter may altogether" should read --object of interest and may altogether--.

Column 10,
Lines 5 through 8, cancel the two repeated sentences "The ROI module 51 may generate one or more ROI in pixels. In one example, the ROI module 51 may convert the one or more pixel-form ROI into block-form ROI."

Signed and Sealed this
Ninth Day of April, 2013

Teresa Stanek Rea
*Acting Director of the United States Patent and Trademark Office*